(12) United States Patent
Levy

(10) Patent No.: US 10,670,823 B2
(45) Date of Patent: Jun. 2, 2020

(54) OPTIC CABLE PULLER ASSEMBLY

(71) Applicant: BELDEN CANADA INC., Saint-Laurent (CA)

(72) Inventor: Moise Levy, Laval (CA)

(73) Assignee: BELDEN CANADA INC. (CA)

( * ) Notice: Subject to any disclaimer, the term of this patent is extended or adjusted under 35 U.S.C. 154(b) by 0 days.

(21) Appl. No.: 15/686,353

(22) Filed: Aug. 25, 2017

(65) Prior Publication Data

US 2018/0067275 A1 Mar. 8, 2018

Related U.S. Application Data

(60) Provisional application No. 62/382,903, filed on Sep. 2, 2016.

(51) Int. Cl.
G02B 6/44 (2006.01)

(52) U.S. Cl.
CPC ......... G02B 6/4465 (2013.01); G02B 6/4433 (2013.01); G02B 6/4495 (2013.01)

(58) Field of Classification Search
CPC ... G02B 6/4433; G02B 6/4465; G02B 6/4495
See application file for complete search history.

(56) References Cited

U.S. PATENT DOCUMENTS

| 4,337,923 | A | * | 7/1982 | Smith | F16G 11/06 174/79 |
| 4,368,910 | A | * | 1/1983 | Fidrych | D07B 1/18 24/115 N |
| 4,375,313 | A | * | 3/1983 | Anderson | G02B 6/4413 174/109 |
| 4,453,291 | A | * | 6/1984 | Fidrych | G02B 6/4465 24/115 N |
| 4,514,005 | A | * | 4/1985 | Fallon | F16L 3/003 24/115 N |
| 4,514,025 | A | * | 4/1985 | Maulandi | H02B 11/04 439/246 |
| 4,601,507 | A | * | 7/1986 | Fallon | F16L 3/003 24/115 N |
| 4,684,211 | A | * | 8/1987 | Weber | G02B 6/4465 254/134.3 R |
| 4,770,491 | A | * | 9/1988 | Champa | G02B 6/4439 174/79 |
| 5,863,083 | A | * | 1/1999 | Giebel | G02B 6/3897 254/134.3 FT |
| 6,199,258 | B1 | * | 3/2001 | Simon | G02B 6/4471 29/235 |
| 6,239,388 | B1 | * | 5/2001 | Karlstrom | G01R 31/021 174/135 |
| 7,672,562 | B1 | * | 3/2010 | Fandl | G02B 6/4465 254/134.3 R |
| 8,091,866 | B2 | * | 1/2012 | White | H02G 1/081 254/134.3 FT |

(Continued)

Primary Examiner — Thomas A Hollweg
Assistant Examiner — Mary A El Shammaa
(74) Attorney, Agent, or Firm — Lavery, De Billy, LLP; Hugh Mansfield

(57) ABSTRACT

A system and puller for pulling an optic cable having reinforcing strands, system comprising a collar secured to the cable reinforcing strands and a puller comprising a housing slideable along the cable to abut the collar and a pulling wire attached to the housing for pulling the collar and cable.

12 Claims, 11 Drawing Sheets

(56) References Cited

U.S. PATENT DOCUMENTS

| | | | | |
|---|---|---|---|---|
| 8,126,307 B2* | 2/2012 | Hovland | G02B 6/4471 | 385/139 |
| 8,209,899 B2* | 7/2012 | Klein | A01K 91/047 | 24/115 N |
| 8,272,787 B2* | 9/2012 | Lu | H02G 15/113 | 385/135 |
| 8,385,712 B2* | 2/2013 | Ahmed | G02B 6/4463 | 29/438 |
| 8,412,017 B2* | 4/2013 | Kowalczyk | G02B 6/54 | 385/136 |
| 8,620,129 B2* | 12/2013 | Rudenick | G02B 6/4433 | 156/293 |
| 8,630,523 B2* | 1/2014 | Smith | G02B 6/4465 | 385/113 |
| 8,757,594 B2* | 6/2014 | Jordan | H02G 1/081 | 254/134 |
| 8,831,395 B2* | 9/2014 | Sievers | G02B 6/4439 | 385/135 |
| 9,429,730 B2* | 8/2016 | Abbiati | G02B 6/4463 | |
| 9,453,982 B2* | 9/2016 | Nhep | G02B 6/4465 | |
| 9,537,293 B2* | 1/2017 | Bennett | H02G 1/081 | |
| 9,664,328 B2* | 5/2017 | Tjader | E21B 7/205 | |
| 9,684,144 B2* | 6/2017 | Ott | G02B 6/46 | |
| 9,885,441 B2* | 2/2018 | Tjader | F16L 55/18 | |
| 9,885,847 B2* | 2/2018 | Kowalczyk | G02B 6/4465 | |
| 10,378,688 B2* | 8/2019 | Tjader | F16L 55/18 | |
| 2002/0053278 A1* | 5/2002 | Hayes | B63C 9/26 | 89/1.34 |
| 2007/0280621 A1* | 12/2007 | Livingston | G02B 6/4465 | 385/139 |
| 2010/0052346 A1* | 3/2010 | Cooke | G02B 6/4465 | 294/86.4 |
| 2010/0178113 A1* | 7/2010 | Tjader | E21B 7/205 | 405/184.3 |
| 2011/0057157 A1* | 3/2011 | Holley | H02G 1/085 | 254/134.3 R |
| 2013/0209174 A1* | 8/2013 | Murphy | H02G 1/081 | 405/154.1 |
| 2013/0219670 A1* | 8/2013 | Tjader | E21B 7/205 | 24/115 R |
| 2013/0294735 A1* | 11/2013 | Burris | G02B 6/4415 | 385/101 |
| 2017/0261716 A1* | 9/2017 | Thompson | G02B 6/3861 | |
| 2018/0003910 A1* | 1/2018 | Menguy | G02B 6/02395 | |

* cited by examiner

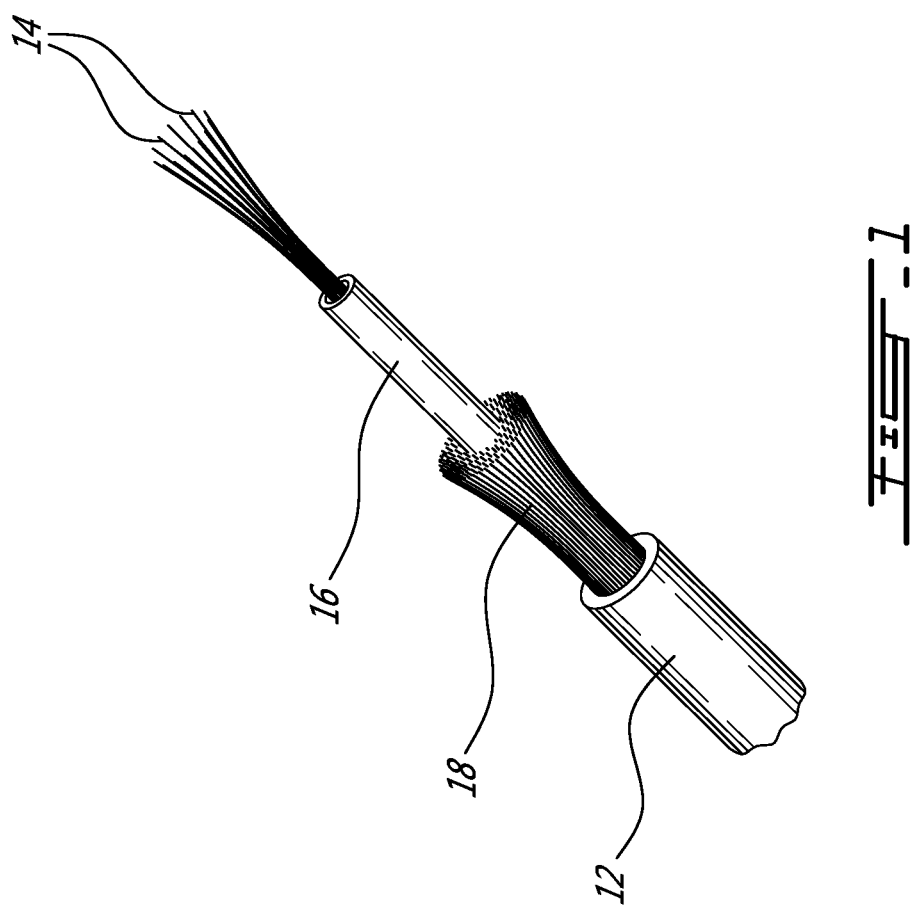

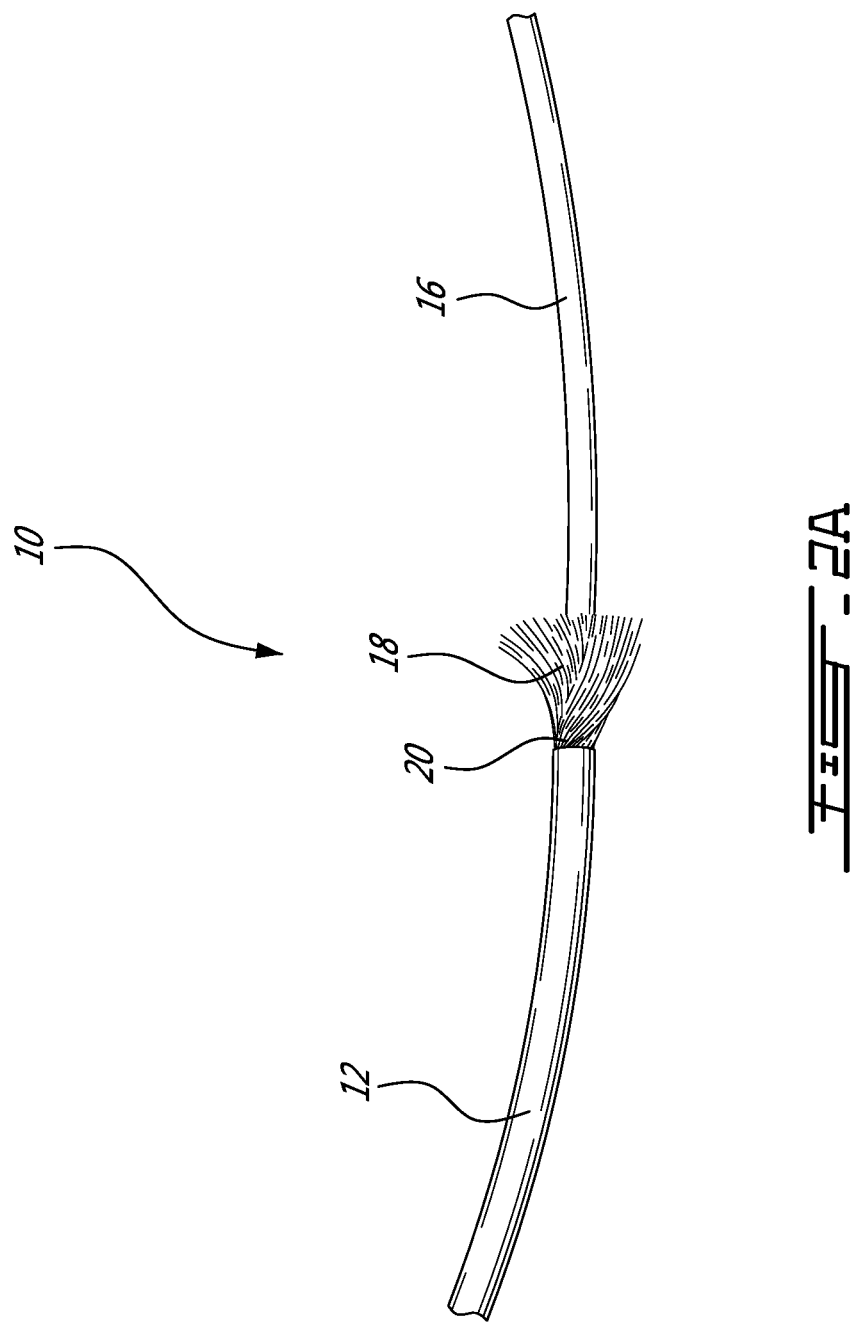

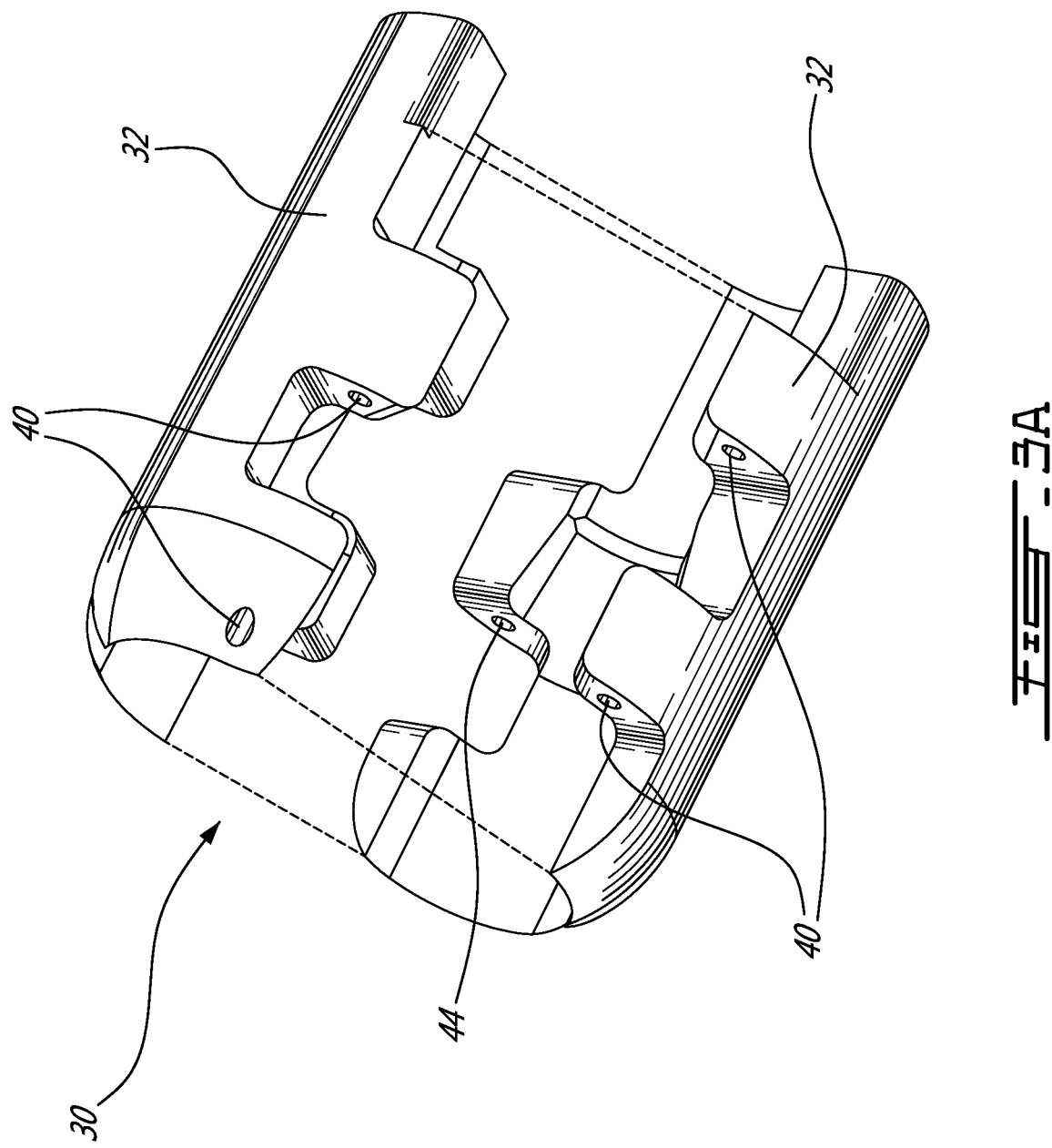

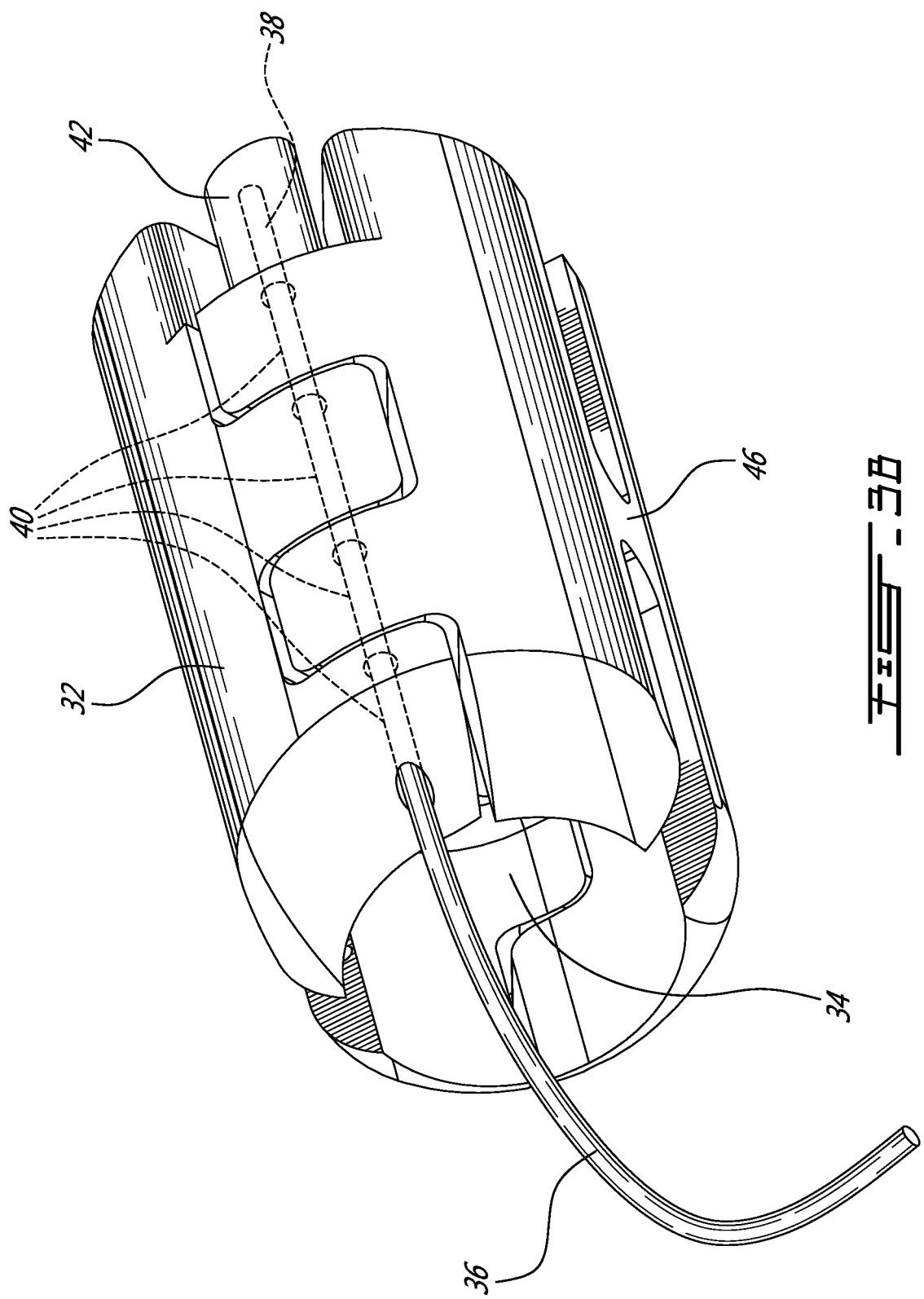

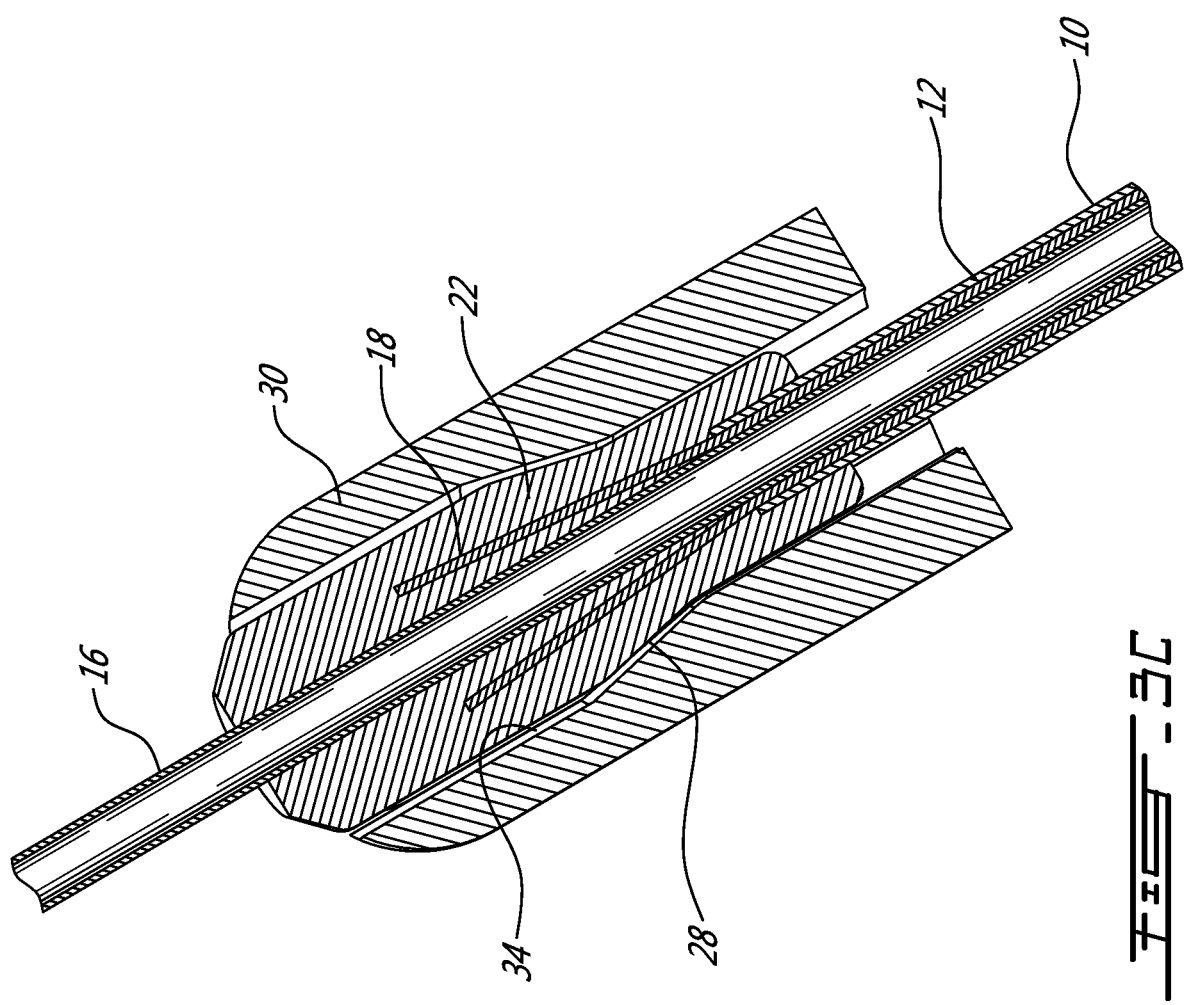

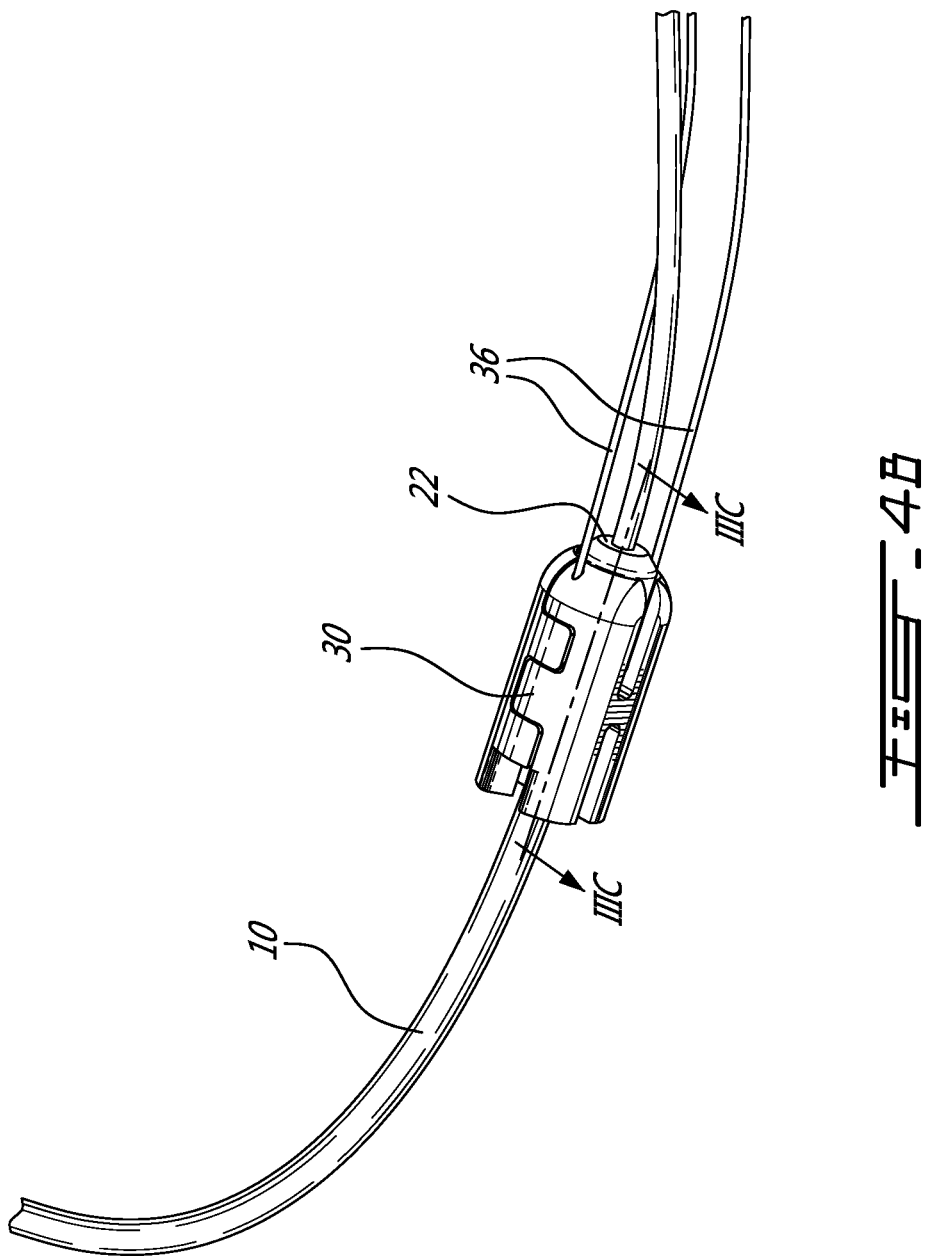

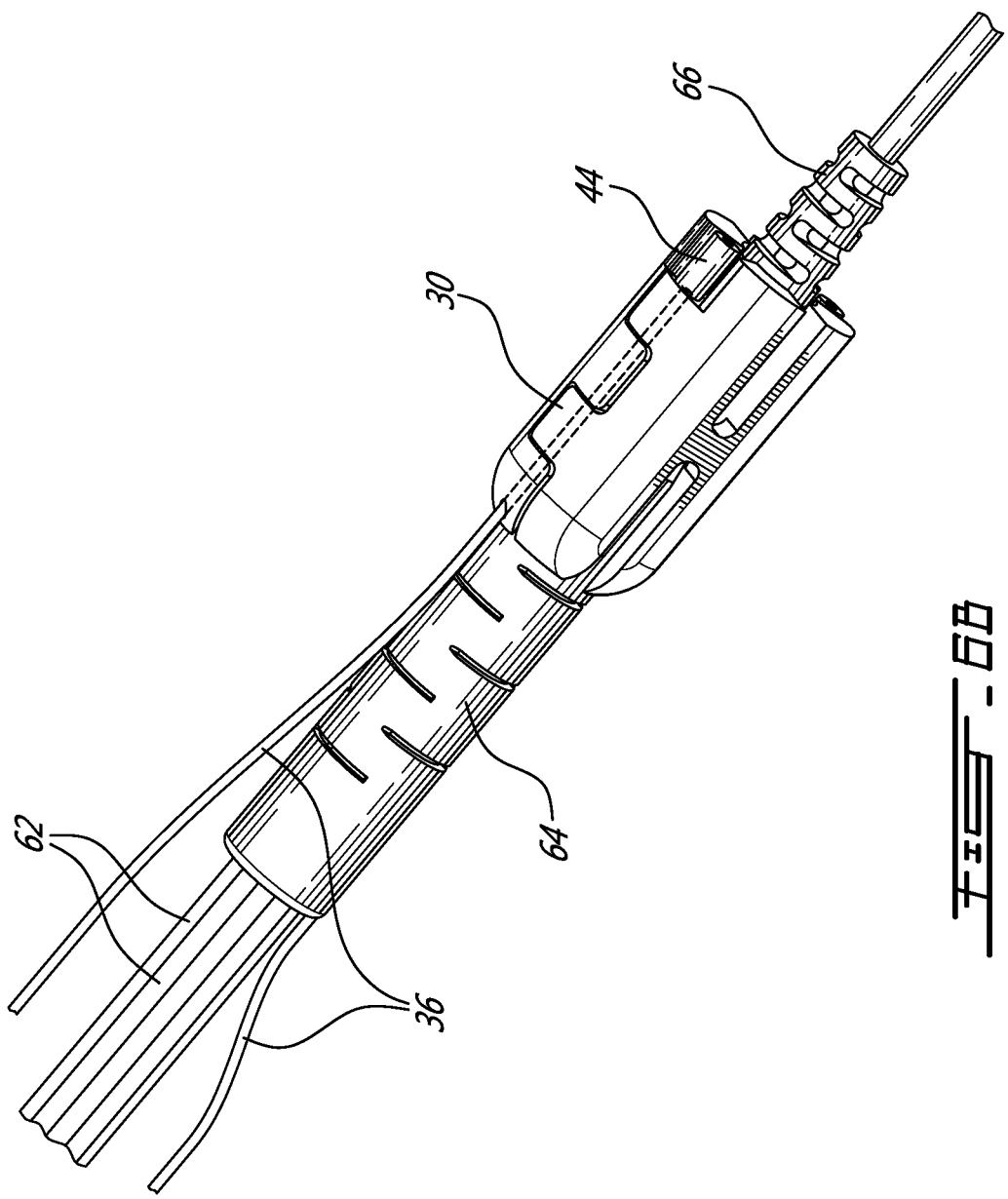

OPTIC CABLE PULLER ASSEMBLY

FIELD OF THE INVENTION

The present relates to an optic puller assembly. In particular, the present relates to methods and assemblies for pulling pre-terminated fiber optic cables.

BACKGROUND OF THE INVENTION

Fiber optic cables comprise relatively fragile parts, such as their inner optic fibers and pre-terminated ends and terminal connectors, and care must be taken when exerting a pulling strain on these beyond a certain threshold force, for example when optic cables are pulled from a spool or through ducts or passageways.

Known pulling methods and assemblies for pulling fiber optic cables involve redirecting part of the pulling force away from the fragile parts. For example, there are known kits that use cable pulling eye assemblies that are attached at the terminal connector end of a fiber optic cable by means of a meshed cover sleeve.

SUMMARY OF THE INVENTION

There is provided a system for pulling an optic cable having a cable outer diameter and comprising an outer jacket, a plurality of reinforcing strands running along a length of the optic cable underneath the outer cable jacket, and at least one optic fiber. The system comprises a stripped cable portion wherein the cable jacket has been removed to expose the reinforcing strands; a cylindrical collar about said stripped cable portion and secured to said exposed reinforcing strands, said collar having a collar maximum outer diameter; and a puller for slideably mounting about the optic cable, said puller comprising a puller inner surface defining an axial passage having a minimum diameter greater than the cable outer diameter and less than said collar maximum outer diameter, and at least one pulling wire extending axially from said housing. The puller is insertable about the optic cable upstream of said collar and engageable with said collar by exerting a pulling force on said pulling wire and such that said pulling force is transferred at least partially via said collar to said reinforcing strands.

There is also provided a puller for pulling an optic cable having at least one optic fiber and a cable outer diameter and comprising an outer jacket, a plurality of reinforcing strands running along a length of the optic cable underneath the outer cable jacket, a stripped cable portion wherein the cable jacket has been removed to expose the reinforcing strands, a cylindrical collar about said stripped cable portion and having a maximum outer diameter, the collar secured to the exposed reinforcing strands. The puller comprises a substantially cylindrical puller housing defining an elongate passageway having a minimum inner diameter greater than the cable outer diameter and less than the collar maximum diameter, said housing comprising a pair of complementary halves, one of said halves arranged on either side of said passageway, each of said halves comprising first and second dentated long edges each comprising at least one tooth and a bore arranged axially and intersecting each of said at least one tooth; and a pulling wire comprising a pair of free ends. The puller is assembled by engaging each of said first dentated long edges with a complementary one of said second dentated long edges and such that said bores of each of said first long edges are aligned with said bores of a complementary one of said second long edges to form a pulling wire receiving passage and, once aligned, securing said first and second long edges together by threading one of said pair free ends through each of said pulling wire receiving passage.

Also, there is provided a method for installing a pulling assembly on a fiber optic cable comprising an outer cable jacket, at least one optic fiber comprising an inner fiber jacket, and a plurality of reinforcing strands running along a length of said optic cable underneath said outer cable jacket. The method comprises removing a portion of the outer cable jacket and revealing a portion of the reinforcing strands; overmoulding the optic cable and strands to form a collar wherein the strands are imbedded in said collar; placing a puller housing about the optic cable upstream of said collar, said housing defining an axial passage for receiving slideably therethrough the optic cable, said puller housing having at least one wire extending axially therefrom; using said at least one pulling wire, abutting said puller against said collar; and pulling said at least one pulling wire to pull said optic cable.

BRIEF DESCRIPTION OF THE DRAWINGS

FIG. 1 provides a perspective view of a fiber optic cable which has been partially stripped to expose Kevlar™ strands, inner jacket and optic fibres;

FIG. 2A provides a top plan view of a fiber optic cable, which has been stripped to reveal aramid strands in accordance with an illustrative embodiment of the present invention;

FIG. 3A provides a perspective view of a puller comprising two shells that are assembled together according to an embodiment of the present invention;

FIG. 3B provides an exploded view of the two shells of the puller of FIG. 3A;

FIG. 3C provides a cross sectional view of a system for pulling a pre-terminated fiber optic cable taken along line IIIC-IIIC of FIG. 4B;

FIG. 4B provides a top view of the fiber optic cable and puller of FIG. 4A, wherein the puller has been pulled over the collar in accordance with an illustrative embodiment of the present invention;

FIGS. 6A and 6B provide a perspective views of a system for pulling a furcated fiber optic cable according to an alternative embodiment of the present invention.

DETAILED DESCRIPTION OF THE ILLUSTRATIVE EMBODIMENTS

Figure 2B:
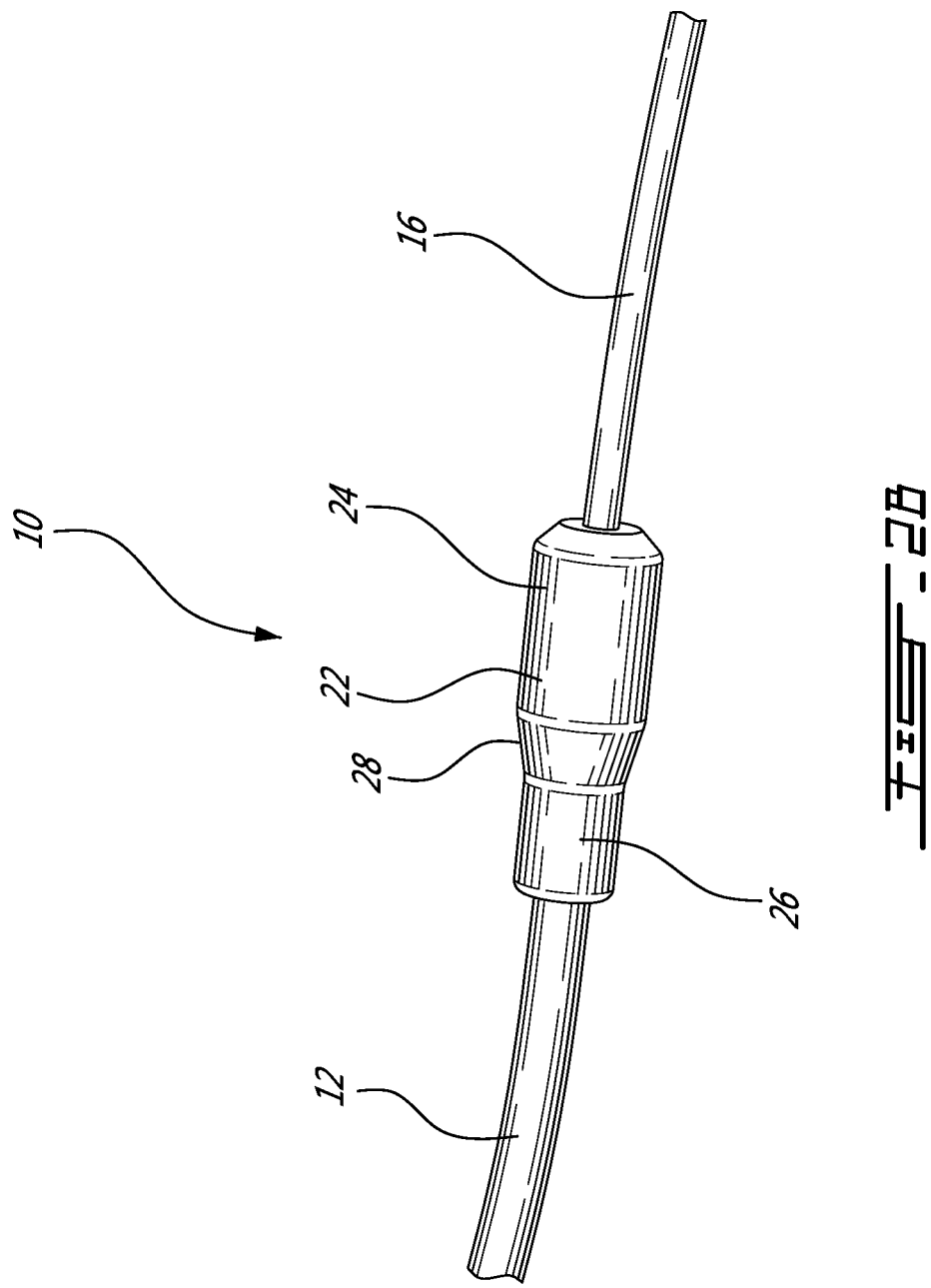
FIG. 2B provides a top plan view of the fiber optic cable shown in FIG. 2A, where a collar has been overmoulded onto the aramid strands in accordance with an illustrative embodiment of the present invention.

Referring now to FIG. 1 there is shown a known multi-fiber fiber optic cable 10 with its terminal end having an outer polymer (such as PVC or the like) cable jacket 12 surrounding a at least one optic fiber 14 encased in an inner polymer cable jacket 16 and a plurality of aramid strands 18 for providing mechanical strength, for example when the cable is pulled. The aramid strands 18 run along a length of the optic cable 10 sandwiched between the outer cable jacket 12 and the inner cable jacket 16 with the optic fibers 14 being retained with the inner cable jacket. In some embodiments a rip cord (not shown) could be provided.

Referring now to FIG. 2A, the fiber optic cable 10 is initially prepared for use with the puller by removing a portion of the outer cable jacket 12 thereby exposing a length of the inner cable jacket 16 as well as an end portion of the aramid strands 18 which are trimmed such that they extend only a small distance beyond the end 20 of the outer cable jacket 12. Referring now to FIG. 2B in addition to FIG. 2A, the trimmed end portion 20 of the aramid fibers is over moulded with a plastic collar 22, for example using injection moulding or the like, and such that the trimmed ends of at aramid strands 18 are imbedded within the collar 22. Additionally, the material to form the collar 22 comes into contact with a portion of the outer cable jacket 12 and a portion of the inner cable jacket 16. In a particular embodiment the aramid strands 18 can be secured lightly about the inner cable jacket 16 using a loop of the trimmed aramid strands or the like. The finished collar 22 as shown is generally cylindrical and bottle shaped comprising a larger diameter main section 24 positioned over the exposed inner cable 16 and a narrower collar portion 26 positioned over the outer cable 12. The transition between the collar portion 26 and the main portion 24 provides a sloped surface 28 against which, as will be discussed in more detail below, a puller (not shown) can abut. In alternative embodiments the finished collar 22 may take on other shapes, for example cuboid and having a square cross-section or generally as an elongate prism, for example with a triangular, pentagonal or other cross-section (all not shown).

Referring now to FIGS. 3A and 3B, a puller 30 is comprised of two like halves 32 which can be assembled together to define an collar accepting passage 34, illustratively annular. Each of the halves comprises complementary first and second dentated long edges each comprising at least one tooth. On assembly the halves are held together by engaging or interlocking the teeth of the respective long edges and using a short length (illustratively about 1 meter in length) of pulling wire 36, such as a stranded cable manufactured from Kevlar, Nylon, or metal such as braided steel, a first free end 38 of which is threaded into a respective passageway defined by a first series of aligned bores 40 along the length of the puller 30 and on both puller halves 32. Once threaded through the bores 40 the first free end 38 of the pulling wire 36 is securely terminated with a first crimp fitting 42. A second free end (not shown) of the pulling wire 36 is similarly threaded through a respective second series of holes 44 and secured using a second crimped fitting (not shown) in a similar fashion.

Still referring to FIG. 3B each puller half 32 comprises a pair of elongate portions connected by a bridge portion 46. The bridge portion 46 can be cut, for example using a pair of clippers of the like (not shown) to release the puller 30 from the cable 12. In an alternative embodiment the bridge portion 46 is designed to break if a force exerted on the collar 22 by the puller 30 exceeds a predetermined amount and in order to ensure that the optic fiber cable 10 is not damaged during pulling. In this regard, and referring to FIG. 3C, the annular collar accepting passage 34 is profiled such that the sloped surface 28 of collar 22 is engaged by the puller 30 and such that a force is produced which is at right angles to the axis of the cable 10 and puller 30.

Figure 4A:
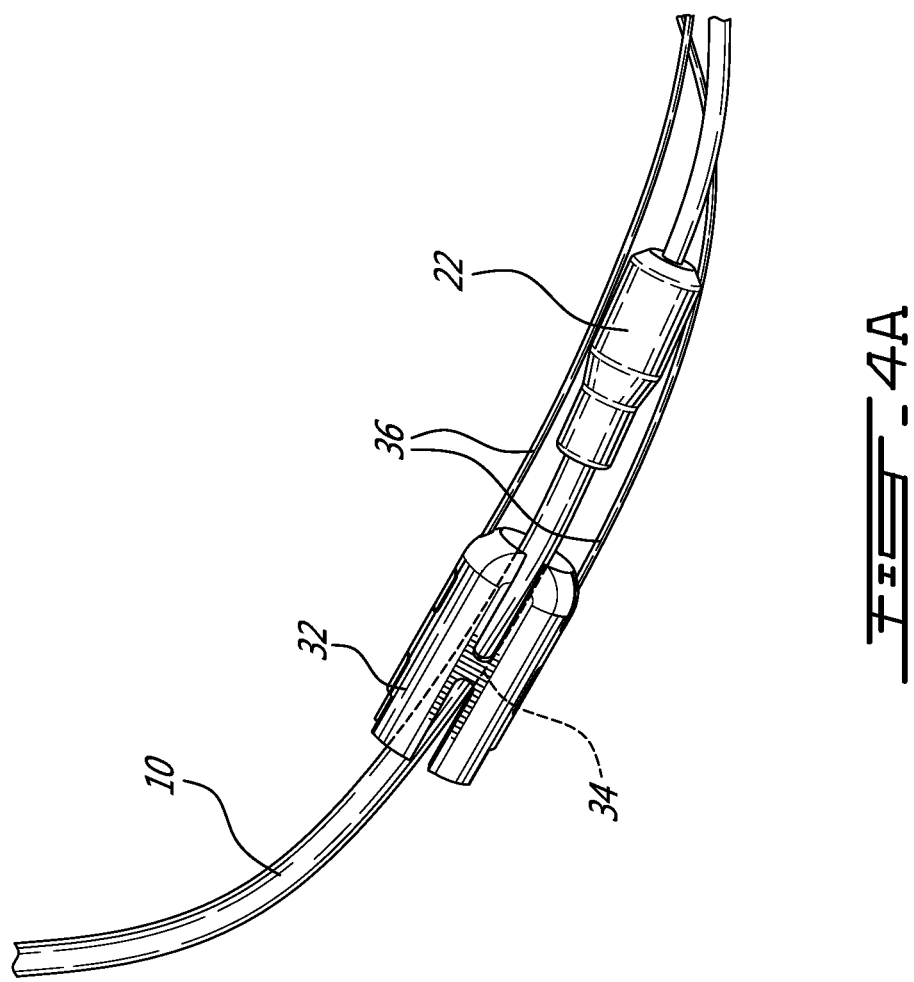
FIG. 4A provides a top plan view of the fiber optic cable of FIG. 3A, wherein a puller with pulling wires has been installed on an fiber optic cable immediately adjacent the collar and in accordance with an illustrative embodiment of the present invention.

Referring now to FIG. 4 in addition to FIG. 3B, in an illustrative embodiment of a method, the puller 30 is installed upstream of the collar 22 formed on the fiber optic cable 10 and such that the collar accepting passage 34 encompasses the optic cable 10. Illustratively, installation is achieved by placing the puller halves 32 on either side pf the fiber optic cable 10 upstream of the collar 22, joining the two halves 32 together by inserting the free ends 38 of the cable 36 into their respective series of holes as discussed above, and securing each of the cable ends with a respective one of the crimp fittings 42. The resultant puller 30 has the pulling wire 36 attached at two separate points thereon and extending axially therefrom. Alternatively the puller may be pre-assembled and the fiber optic cable 10 simple threaded through the collar accepting passage 34 until the puller 30 rests adjacent the collar 22. Referring now to FIG. 4B in addition to FIG. 4A, during pulling the puller 30 is moved along the cable 10 by force applied to the pulling wire 36 and until it engages the collar 22 which is received within the collar accepting passage 34.

Figure 5A:
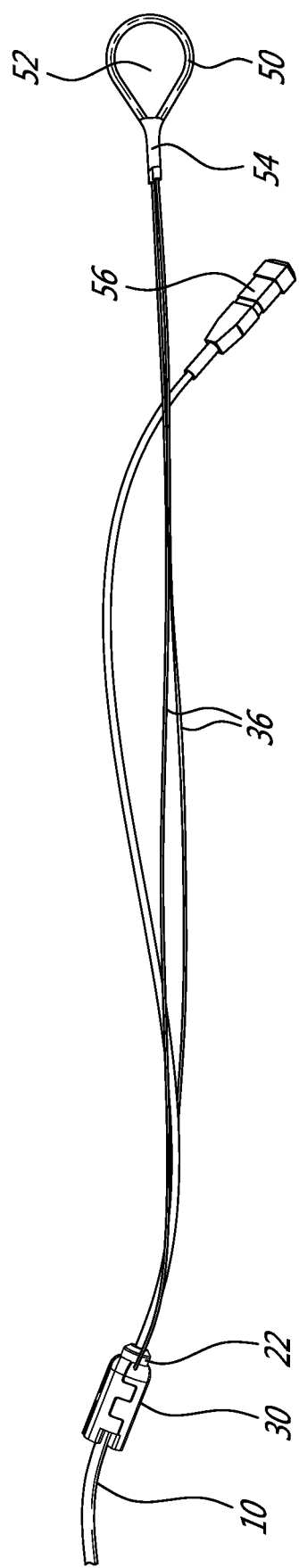
FIG. 5A provides a top plan view of a terminated fiber optic cable with a puller installed and showing a pulling loop in accordance with an illustrative embodiment of the present invention.
Figure 5B:
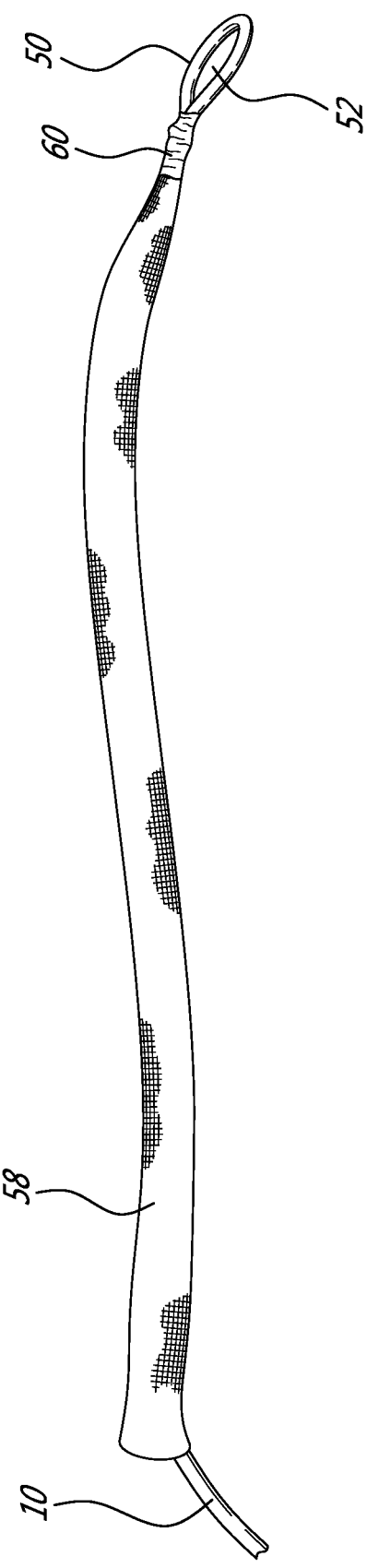
FIG. 5B provides a top plan view of a fiber optic cable with a cover sleeve installed over the terminated end of the fiber optic cable and the puller in accordance with an illustrative embodiment of the present invention.

Still referring to FIG. 4B, once the fiber optic cable 10 has been pulled into position the puller Referring now to FIG. 5A, in order to provide a convenient puller loop, and prior to assembly of the puller 30, the steel cable 36 can be inserted through a length of cable cover 50 to a point approximately half way between the ends of the pulling wire 36. A loop 52 is then formed by securing the pulling wire 36 to itself using a length of flexible tape 54 or the like. Referring to FIG. 5B in addition to FIG. 5A, in order to protect the terminated end 56 of the fiber optic cable 10, terminated by an optical fiber connector such as an FC, LC, SC FO, MPO, MT-RJ or other type of connector, for mating with other equipment, a hollow woven cover sock, or sleeve 58, can be secured to the steel cable 36 adjacent the loop 52, for example using a length of flexible adhesive tape 60 or the like. In this manner the fiber optic cable can be pulled through narrow cables without the terminated end 56 folding back on itself.

Figure 6A:
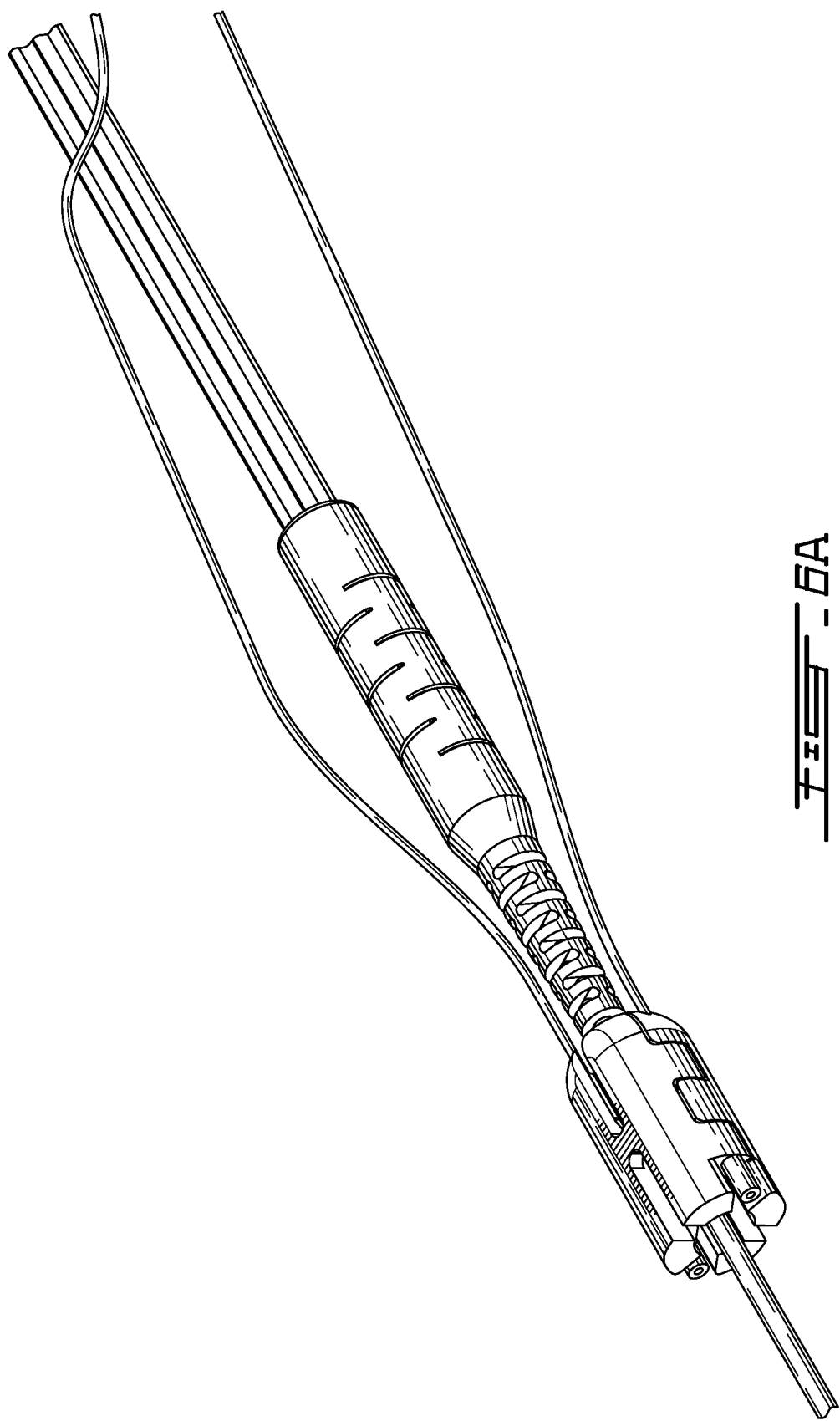

Referring now to FIGS. 6A and 6B, the system of the present invention may be applied in a furcation configuration where several optic cables 62 each with their own jacket are furcated together. In this regard and as with the collar 22 as discussed above, the aramid strands are molded into a furcation assembly 64. A flexible strain relieving boot 66 is typically molded together with the furcation assembly 64 and a sloping region 68 between the furcation assembly 64 and the flexible strain relieving boot 66. By applying a pulling force to the pulling wire 36 which is terminated at both ends by the pair of crimp fittings 42, the puller 30 engages the sloping region 68 and transmits the pulling force to the cable 10. Although the furcation assembly 68 is shown as being cylindrical and of a generally circular cross section, in a particular embodiment the furcation assembly 68 may be of a different shape, for example cuboid and of square cross section or another elongate shape (all not shown). In this regard, and with reference to FIG. 3C in addition to FIGS. 6A and 6B, a person of ordinary skill in the art will understand that, in order for the puller 30 to mate correctly with the furcation assembly 68, the collar accepting passage 34 will need to be modified to correspond to the outer shapes of the alternative furcation assemblies 68.

The present system and method may also be applied to single jacket optic cable or double jacket optic cables or any multiple jacket covered optic cables as persons skilled in the art will understand.

Although the present invention has been described hereinabove by way of specific embodiments thereof, it can be modified, without departing from the spirit and nature of the subject invention as defined in the appended claims.

The invention claimed is:

1. A puller for pulling an optic cable having at least one optic fiber and a cable outer diameter and comprising an outer jacket, a plurality of reinforcing strands running along a length of the optic cable underneath the outer cable jacket, a stripped cable portion wherein the cable jacket has been removed to expose the reinforcing strands, a collar about said stripped cable portion and having a maximum outer width, the collar secured to the exposed reinforcing strands, the puller comprising:

a puller housing defining an elongate passageway along an axis for slideably receiving said cable, said passageway having a minimum inner width greater than the cable outer diameter and less than the collar maximum width, said housing comprising a pair of complementary halves, one of said halves arranged on either side of said passageway, each of said halves comprising first and second dentated long edges each comprising at least one tooth and a bore arranged in parallel to said axis and intersecting each of said at least one tooth laterally wherein at least one of said halves comprises two elongate portions interconnected by a cutable bridge portion and further wherein said bridge portion may be cut thereby releasing the puller from the cable; and a pulling wire comprising a pair of free ends;

wherein the puller is assembled by engaging each of said first dentated long edges with a complementary one of said second dentated long edges and such that said bores of each of said first long edges are aligned with said bores of a complementary one of said second long edges, said aligned bores together forming a pulling wire receiving passage and, once aligned, securing said first and second long edges together by threading one of said pair free ends through each of said pulling wire receiving passage.

2. The puller of claim 1, wherein each of said halves are substantially identical.

3. The puller of claim 1, wherein said puller housing is substantially cylindrical.

4. The puller of claim 1, wherein the collar is substantially cylindrical and comprises a circular cross section, the maximum outer width comprises a maximum outer diameter, said minimum inner width comprises a minimum inner diameter and said minimum inner diameter is greater than the cable outer diameter and less than the maximum outer diameter.

5. The puller of claim 1, further comprising a pair of crimp fittings and further wherein following threading each of said wire ends is terminated by one of said fittings.

6. The puller of claim 1, wherein said passageway has an inner surface complementary to an outer surface of the collar.

7. A puller for pulling an optic cable having at least one optic fiber and a cable outer diameter and comprising an outer jacket, a plurality of reinforcing strands running along a length of the optic cable underneath the outer cable jacket, a stripped cable portion wherein the cable jacket has been removed to expose the reinforcing strands, a collar about said stripped cable portion and having a maximum outer width, the collar secured to the exposed reinforcing strands, the puller comprising:

a puller housing defining an elongate passageway along an axis for slideably receiving said cable, said passageway having a minimum inner width greater than the cable outer diameter and less than the collar maximum width, said housing comprising a pair of complementary halves, one of said halves arranged on either side of said passageway, each of said halves comprising first and second dentated long edges each comprising at least one tooth and a bore arranged in parallel to said axis and intersecting each of said at least one tooth laterally wherein at least one of said halves comprises a zone of reduced strength and wherein said zone of reduced strength will break thereby releasing the puller when a pulling force exerted on the collar by said puller exceeds a predetermined amount; and a pulling wire comprising a pair of free ends;

wherein the puller is assembled by engaging each of said first dentated long edges with a complementary one of said second dentated long edges and such that said bores of each of said first long edges are aligned with said bores of a complementary one of said second long edges, said aligned bores together forming a pulling wire receiving passage and, once aligned, securing said first and second long edges together by threading one of said pair free ends through each of said pulling wire receiving passage.

8. The puller of claim 7, wherein each of said halves are substantially identical.

9. The puller of claim 7, wherein said puller housing is substantially cylindrical.

10. The puller of claim 7, wherein the collar is substantially cylindrical and comprises a circular cross section, the maximum outer width comprises a maximum outer diameter, said minimum inner width comprises a minimum inner diameter and said minimum inner diameter is greater than the cable outer diameter and less than the maximum outer diameter.

11. The puller of claim 7, further comprising a pair of crimp fittings and further wherein following threading each of said wire ends is terminated by one of said fittings.

12. The puller of claim 7, wherein said passageway has an inner surface complementary to an outer surface of the collar.

* * * * *